United States Patent
Kaliyamoorthy et al.

(10) Patent No.: US 8,713,238 B1
(45) Date of Patent: Apr. 29, 2014

(54) RECOVERY OF A HOT-PLUGGABLE SERIAL COMMUNICATION LINK

(75) Inventors: Killivalavan Kaliyamoorthy, Cuddalore DT (IN); Guru Prasanna Sethumadhavan, Coimbatore (IN)

(73) Assignee: Xilinx, Inc., San Jose, CA (US)

( * ) Notice: Subject to any disclaimer, the term of this patent is extended or adjusted under 35 U.S.C. 154(b) by 664 days.

(21) Appl. No.: 13/036,408

(22) Filed: Feb. 28, 2011

(51) Int. Cl.
   *H05K 7/10* (2006.01)
(52) U.S. Cl.
   USPC ............................... 710/302; 714/3
(58) Field of Classification Search
   USPC ............... 710/301–302; 714/2–6.32
   See application file for complete search history.

(56) References Cited

U.S. PATENT DOCUMENTS

| | | |
|---|---|---|
| 7,191,255 B2 | 3/2007 | Wong et al. |
| 7,724,645 B2 | 5/2010 | Bedwani et al. |
| 2008/0046624 A1 | 2/2008 | Rubin et al. |
| 2010/0083030 A1 | 4/2010 | Thayer |

*Primary Examiner* — Clifford Knoll
(74) *Attorney, Agent, or Firm* — LeRoy D. Maunu

(57) ABSTRACT

A communication circuit includes a communication port, a receiver an aligner, and a link recovery circuit. The communication port is configured to connect to a communication link and to disconnect from the communication link. The receiver is configured to generate, while the communication link is connected to the communication port, a serial sequence of received bits recovered from the communication link. The aligner is configured to decode a received sequence of blocks from the serial sequence of received bits. The blocks of the received sequence include data blocks and control blocks. The link recovery circuit is configured to reset the receiver in response to the blocks, in the received sequence after a first one of the control blocks and before a next one of the control blocks, numbering greater than a threshold number.

20 Claims, 2 Drawing Sheets

RECOVERY OF A HOT-PLUGGABLE SERIAL COMMUNICATION LINK

FIELD OF THE INVENTION

One or more embodiments generally relate to serial data communication, and more particularly to hot-pluggable high-speed serial communication links.

BACKGROUND

Serial communication links are widely used to transfer data between electronic devices. A serial communication link supporting dynamic connection permits connections to be established and broken between active electronic devices. This increases the flexibility of the serial communication link because a user does not need to turn off the electronic devices before mechanically connecting the electronic devices. However, at high data rates it is difficult to ensure the continued reliability of serial communication links after establishing and breaking multiple connections.

SUMMARY

In one embodiment, a communication circuit includes a communication port, a receiver, an aligner, and a link recovery circuit. The communication port is configured to connect to a communication link and to disconnect from the communication link. The receiver is configured to generate, while the communication link is connected to the communication port, a serial sequence of received bits recovered from the communication link. The aligner is configured to decode a received sequence of blocks from the serial sequence of received bits. The blocks of the received sequence include data blocks and control blocks. In response to the blocks, the link recovery circuit is configured to reset the receiver in the received sequence after a first one of the control blocks and before a next one of the control blocks, numbering greater than a threshold number.

In one embodiment, a communication circuit includes a transmitter, a receiver, and a communication link for coupling the transmitter and the receiver. The transmitter is configured to serially transmit a training sequence during initialization, and following the initialization to serially transmit a first serial sequence of bits. The communication link is configured to connect and disconnect the transmitter and the receiver. The receiver is configured to generate a received sequence of blocks. The receiver includes a link recovery circuit, a clock-and-data recovery circuit, and an aligner. The link recovery circuit is configured to initiate the initialization in response to the blocks, in the received sequence after one control block and before a next control block, numbering greater than a threshold number. The clock-and-data recovery circuit is configured to recover a received clock signal locked to the training sequence while the communication link connects the transmitter and the receiver during the initialization, and following the initialization the clock-and-data recovery circuit is configured to recover the received clock signal locked to the first serial sequence and to serially recover a second serial sequence including the bits. The aligner is configured to decode the received sequence of the blocks from the second serial sequence of the bits.

It will be appreciated that various other embodiments are set forth in the Detailed Description and Claims which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Figure 1:
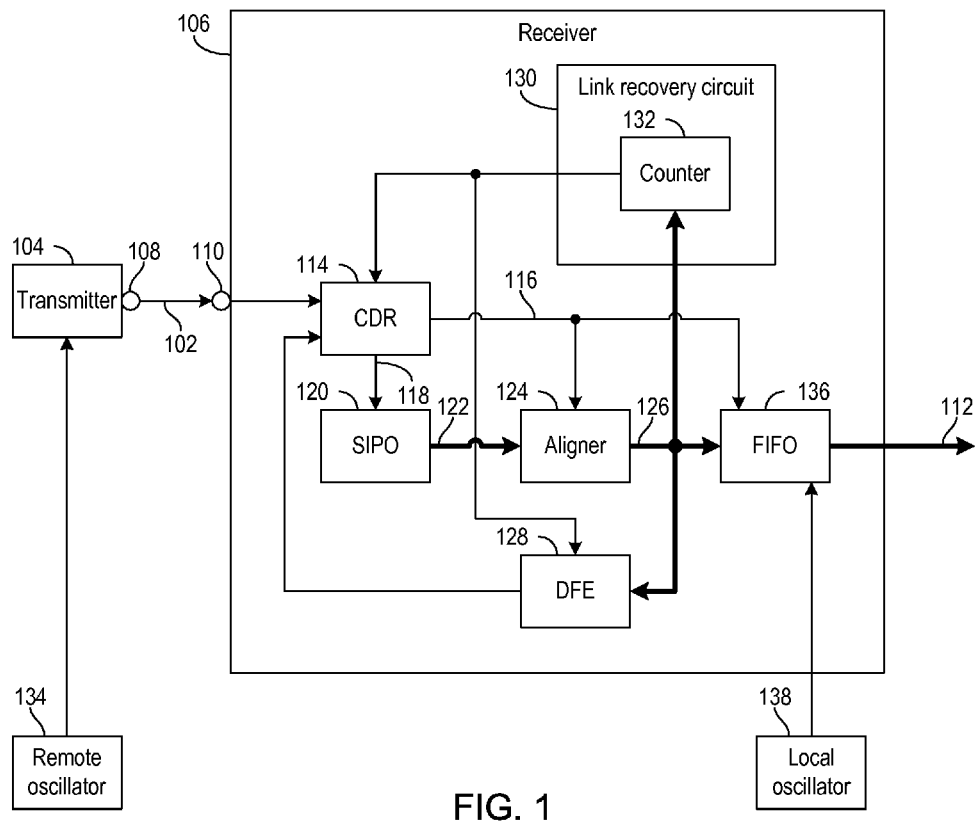
FIG. 1 is a block diagram of a communication circuit supporting connection and disconnection of a communication link.

FIG. 1 is a block diagram of a communication circuit supporting connection and disconnection of a communication link on line 102. The communication link on line 102 selectively connects and disconnects the transmitter 104 and the receiver 106.

During initialization, the transmitter 104 serially transmits a training sequence and receiver 106 receives the training sequence when the communication link on line 102 connects the transmit communication port 108 to the receive communication port 110. In one embodiment, the communication link on line 102 is a cable that can be connected or disconnected from one or both of the communication ports 108 and 110. Following initialization, the transmitter 104 serially transmits a serial sequence of bits, and the receiver 106 generates a received sequence of blocks on line 112 that is generated from this serial sequence of bits.

The receiver 106 includes a clock-and-data recovery unit 114 that is a receiver from the communication link on line 102. While the communication link on line 102 connects the communication ports 108 and 110, the clock-and-data recovery unit 114 recovers a received clock signal on line 116 and the serial sequence of received bits on line 118. During initialization, the receive clock signal on line 116 is locked to the training sequence transmitted by transmitter 104. Following initialization, the clock-and-data recovery unit 114 recovers the received clock signal locked to the serial sequence of bits transmitted by transmitter 104. When the communication circuit is operating properly, the clock-and-data recovery unit 114 also recovers serial sequence of received bits on line 118 that match the serial sequence of bits transmitted from transmitter 104.

The receiver 106 includes a serial-in-parallel-out (SIPO) shift register 120 that groups the serial sequence of received bits on line 118 into blocks. In one embodiment, each parallel block on line 122 includes ten of the received bits, and using an 8B10B code, each block encodes either an eight-bit data character or a control character. In another embodiment, each block on line 122 includes sixty-six of the received bits, and using a 64B66B code, each block encodes either sixty-four data bits or a control block. Those skilled in the art will recognize that the teachings herein may be adapted to cover 128B/130B codes.

In one embodiment, the parallel block on line 122 is not aligned to the data and control blocks, such that the parallel block on line 122 may include the end of one block and the start of the next block. The aligner 124 of the receiver 106 determines the boundaries between the data and control blocks and outputs aligned data and control blocks on line 126. In another embodiment, aligner 124 determines the boundaries between the data and control blocks and provides feedback that controls SIPO shift register 120 to align the parallel block on line 122 to the determined boundaries.

For an 8B10B code, a small number of the control characters are "comma" characters that include one or more unique sequences of bits that are not included in any possible adjacent pair of encoded control or data characters. When the aligner 124 detects one of these unique sequences, the aligner 124 detects the "comma" character and additionally detects the character boundary. The aligner 124 outputs each aligned control or data character on line 126. In one embodiment, the aligner 124 also indicates an invalid character on line 126 for a running disparity error or a ten-bit value that is not a valid encoding of a control or data character.

For a 64B66B code, a two-bit header in each block has four possible values, but the 64B66B code uses only two of these values. Because the 64B66B code scrambles the sixty-four bits of data included after the header, two adjacent bits in this data have all four possible values in roughly equal proportions over many blocks.

In one embodiment, the aligner 124 includes a counter for each pair of circularly adjacent bits for the 64B66B code. Each counter is incremented when the pair of adjacent bits has a valid header value and otherwise the counter is cleared. Thus, the pair corresponding to the header will increment continuously while the other pairs increment only to small values before becoming cleared. The aligner 124 detects the pair of circularly adjacent bits that correspond to the header when one of the counters reaches a designated threshold. The aligner 124 then shifts the parallel block on line 122 to create an aligned block on line 126, or the aligner 124 provides feedback allowing SIPO shift register 120 to create the aligned block on line 122.

In another embodiment, the aligner 124 includes only one counter that checks each pair of adjacent bits for the 64B66B code. The counter is cleared and moves on to the next pair of adjacent bits for each invalid header value, and the counter counts valid header values until the counter reaches a designated threshold that indicates the current pair of adjacent bits corresponds to the header.

The clock-and-data recovery unit 114 recovers the received clock signal on line 116 while the communication link on line 102 connects transmitter 104 and receiver 106. After the communication link on line 102 disconnects transmitter 104 and receiver 106, clock-and-data recovery unit 114 continues to try to recover and output the received clock signal on line 116; however, the phase and frequency of the received clock signal on line 116 drifts while the communication link on line 102 disconnects transmitter 104 and receiver 106. In one embodiment, the clock-and-data recovery unit 114 detects when the received clock signal on line 116 is no longer locked. After lock is lost, the clock-and-data recovery unit 114 enters a deadlocked state to indicate the received clock signal on line 116 is not locked to the communication link on line 102.

After the communication link on line 102 reconnects transmitter 104 and receiver 106, the clock-and-data recovery unit 114 remains in the deadlocked state. This is because while the clock-and-data recovery unit 114 might reestablish a lock to the serial sequence transmitted by transmitter 104, the frequency drift during disconnection might cause lock reestablishment at a harmonic frequency. Thus, clock-and-data recovery unit 114 cannot assure lock at the correct frequency after disconnection of the communication link on line 102, and the clock-and-data recovery unit 114 remains in deadlocked state to indicate the received clock signal on line 116 is not locked to the communication link on line 102.

In one embodiment, the receiver 106 includes a decision feedback equalizer 128 for reducing the inter-symbol interference in the serial sequence of received bits. Impedance discontinuities, including the communication ports 108 and 110, reflect energy back and forth along the communication link on line 102. After a particular received bit reaches receiver 106, the impedance discontinuities reflect energy from the particular received bit back and forth, such that clock-and-data recovery unit 114 receives some energy from the particular received bit during the receipt of subsequent received bits at receiver 106. This is inter-symbol interference and the magnitude and timing of the inter-symbol interference depends upon many factors, including the magnitude of each impedance discontinuity and the physical length of the communication link on line 102. The decision feedback equalizer 128 effectively determines the magnitude and timing of the inter-symbol interference of the received bits in each block on line 126, and generates feedback to the clock-and-data recovery unit 114 that subtracts this inter-symbol interference from the serial sequence of bits transmitted by transmitter 104.

After disconnecting the communication link on line 102 from transmitter 104 and/or receiver 106, the same or a different communication link may be connected to the receive communication port 110. If a different communication link is connected to the receive communication port 110, this different communication link may have different impedance discontinuities and a different length. Thus, the magnitude and timing of the inter-symbol interference of the prior communication link on line 102 is not generally applicable to a subsequently established communication link. The decision feedback equalizer 128 enters a deadlocked state upon disconnection of the communication link on line 102, and the decision feedback equalizer 128 remains in the deadlocked state upon reconnection of the communication link on line 102 or reconnection of another communication link. The deadlock state indicates that clock-and-data recovery unit 114 cannot recover of the serial sequence from the communication link on line 102 because the decision feedback equalizer 128 cannot properly compensate for inter-symbol interference.

The deadlocked state of the clock-and-data recovery unit 114 and the decision feedback equalizer 128 prevents dynamic disconnection and reconnection of communication links. After disconnection of the communication link on line 102 and reconnection of another communication link, the clock-and-data recovery unit 114 and the decision feedback equalizer 128 should be initialized to reestablish proper operation of the reconnected communication link.

The receiver 106 includes a link recovery circuit 130 that automatically resets the clock-and-data recovery unit 114 and the decision feedback equalizer 128 after disconnection and reconnection of the communication link on line 102. The link recovery circuit 130 initiates an initialization of receiver 106 when a counter 132 reaches a threshold number. In one embodiment, the counter 132 resets to zero at each block on line 126 that is a control block, and the counter 132 counts the blocks on line 126 that are not control blocks. Thus, the counter 132 initiates the initialization when the blocks on line 126 between two successive control blocks number greater than the threshold number.

In one embodiment, the aligner 124 generates invalid blocks while not having block synchronization with the serial sequence of received bits. The aligner 124 may lose block synchronization and generate invalid blocks instead of aligned data and control blocks while the communication link 102 is disconnected from the receive communication port 110. The link recovery circuit 130 also resets the receiver 106 when more than the threshold number of invalid or data blocks are received between successive control blocks.

In one embodiment, the blocks on line 126 of the received sequence include a plurality of clock compensation sequences for compensating for a difference between a signaling rate for the received clock signal on line 116 and a signaling rate for a local clock signal. A remote oscillator 134 generates a transmit clock signal for transmitter 104, and the clock-and-data recovery unit 114 recovers the received clock signal on line 116 that is a delayed version of the transmit clock signal from remote oscillator 134. While the remote and local oscillators 134 and 138 provide the same nominal signaling rate, the remote and local oscillators 134 and 138 generally provide slightly different signaling rates.

In this embodiment, the first-in-first-out (FIFO) buffer 136 inputs a block on line 126 at each active edge of the received clock signal on line 116 and the FIFO buffer 136 outputs a block of the received sequence on line 112 at each active edge of the local clock signal from local oscillator 138. To compensate for the slight difference in the signaling rates, the FIFO buffer 136 deletes a control block from a clock compensation sequence when necessary to prevent overflow of the FIFO buffer 136 because the received clock signal on line 116 has a higher signaling rate than the local oscillator 138 provides, and the FIFO buffer 136 repeats a control block of a clock compensation sequence when necessary to prevent underflow of the FIFO buffer 136 because the received clock signal on line 116 has a lower signaling rate than the local oscillator 138 provides. Deleting or repeating control blocks of a clock compensation sequence compensates for the difference of signaling rates between the remote and local oscillators 134 and 138 without affecting any data blocks.

To compensate for any difference in signaling rates within the supported tolerance for the remote and local oscillators 134 and 138, the transmitter 104 should periodically repeat the clock compensation sequence at a rate given by this tolerance and the maximum number of control blocks that FIFO buffer 136 can delete or add in a clock compensation sequence.

In one embodiment, the link recovery circuit 130 is configured to also use the clock compensation sequences to automatically reset the clock-and-data recovery unit 114 and the decision feedback equalizer 128 upon disconnection and reconnection of the communication link on line 102. During normal operation, the periodic receipt of the control blocks of the clock compensation sequences inhibits link recovery circuit 130 from resetting receiver 106. However, when the link recovery circuit 130 does not receive any control blocks during an interval greater than the expected separation between the periodic clock compensation sequences, the link recovery circuit 130 resets receiver 106. Thus, the link recovery circuit 130 detects the termination of the periodic clock compensation sequences soon after disconnection of the communication link on line 102. In one example, the SIPO shift register 120 outputs a block on line 122 that has a constant value while the clock-and-data recovery unit 114 is in the deadlocked state. This causes the aligner 124 to generate repetitions of one data block while the receiver 106 is in the deadlocked state. The link recovery circuit 130 detects the lack of control blocks in the repetitions of the data block, and the link recovery circuit 130 resets the receiver 106 when the repetitions of the data block number greater than the threshold number.

In this embodiment, counter 132 of the link recovery circuit 130 is set to zero for each control block on line 126, and counter 132 increments for each block on line 126 that is not a control block. Thus, counter 132 generates a count of the blocks between the last control block in each clock compensation sequence and the initial control block in the next clock compensation sequence. In other words, counter 132 generates a count of the blocks on line 126 in the received sequence between each successive pair of clock compensation sequences. Counter 132 resets receiver 106 when the count exceeds a threshold number for some successive pair of clock compensation sequences.

Figure 2:
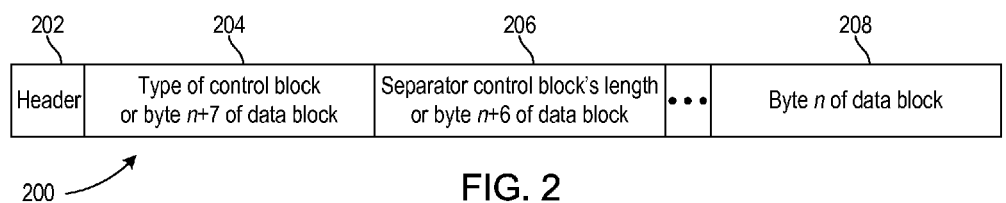
FIG. 2 is a diagram of an example format of a data or control block transferred over a communication link.

FIG. 2 is a diagram of an example format of a data or control block 200 transferred over a communication link. Each block 200 in the received sequence begins with a header 202 including two of the received bits, and eight bytes 204, 206, through 208 follow the header 202. Thus, the blocks in the received sequence all include an equal number of the received bits.

The two bits of the header 202 have four possible values. One value of the header 202 identifies the block 200 as a data block, and another value of the header 202 identifies the block 200 as a control block. The remaining two possible values of the header 202 are unused, and a block 200 is an invalid block when its header 202 has either of these two unused values.

If the header 202 identifies the block 200 as a data block, the eight bytes 204, 206, through 208 following the header 202 specify sixty-four bits of data. Usually, the eight data bytes 204, 206, through 208 are scrambled to increase the likelihood of frequent transitions between the values of adjacent bits within the eight data bytes 204, 206, through 208. These frequent transitions assist clock and data recovery when the bits are serially received from a communication link, and these frequent transitions help distinguish the header 202 from other adjacent pairs of bits within an unaligned sequence of blocks.

If the header 202 identifies the block 200 as a control block, the byte 204 following the header 202 specifies the type of the control block. In one example, the types of control blocks include a separator type, a separator-seven type, and a clock compensation type.

A control block 200 having a byte 204 of separator type indicates the end of one frame and the beginning of the next frame, and byte 206 includes a length of from zero to six final data bytes of the ending frame and these final data bytes are included within the remainder of the control block 200. Similarly, a control block 200 having a byte 204 of separator-seven type indicates the end of one frame and the beginning of the next frame, and the final seven data bytes of the ending frame are included in bytes 206 through 208 of the control block 200.

A control block 200 having a byte 204 of the clock compensation type indicates that the control block 200 is part of a clock compensation sequence. A clock compensation sequence includes multiple control blocks 200 having the clock compensation type.

Figure 3:
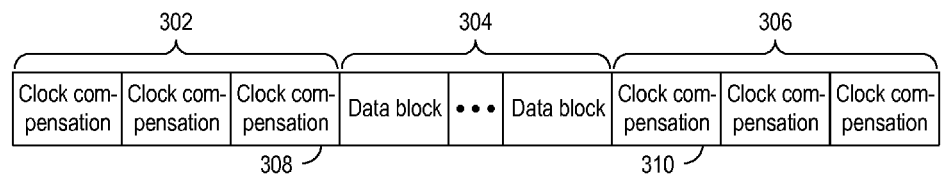
FIG. 3 is a diagram of an example of sequences of data and clock compensation blocks transferred over a communication link.

FIG. 3 is a diagram of an example of sequences of data and clock compensation blocks transferred over a communication link. The clock compensation sequences are periodically interspersed between various data sequences.

A first clock compensation sequence 302 is a contiguous sequence of three control blocks having the clock compensation type. A sequence of data blocks 304 follows the clock compensation sequence 302. A next clock compensation sequence 306 is a contiguous sequence of three control blocks having the clock compensation type.

To compensate for any difference in signal rates between the transmitter and receiver connected by the communication link, the receiver may delete control block 308 to decrease the length of clock compensation sequence 302 to two control blocks, or the receiver may repeat control block 308 to increase the length of clock compensation sequence 302 to four control blocks. To support a given tolerance on the signaling rates of the transmitter and the receiver, the length of the data sequence 304 between the clock compensation sequences 302 and 306 is limited, and the given tolerance specifies the maximum length of data sequence 304. When the blocks in the data sequence 304, after control block 308 and before control block 310, number greater than a threshold number that is greater than the maximum allowed length of data sequence 304, the clock compensation sequence 306 was not received as expected, indicating that the communication link has become disconnected.

Figure 4:
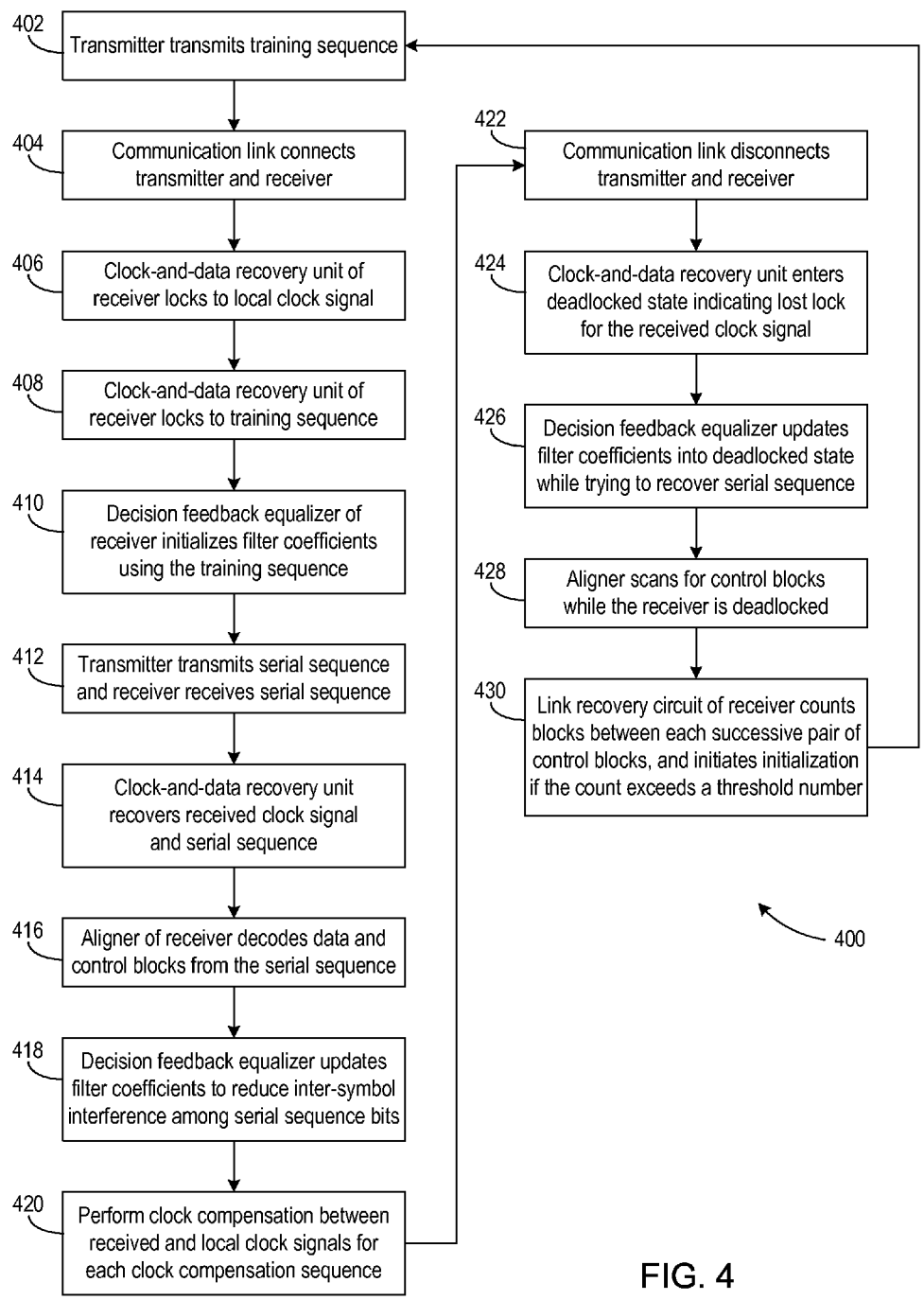
FIG. 4 is a flow diagram of a process for connection, disconnection, and reconnection of a communication link.

FIG. 4 is a flow diagram of a process 400 for connection, disconnection, and reconnection of a communication link. The receiver is automatically reinitialized after reconnection of the communication link.

At block 402, the transmitter transmits a training sequence to begin initialization of the communication link. The transmitter may begin transmitting the training sequence either before or after the communication link connects the transmitter and the receiver. At block 404, the communication link connects the transmitter and the receiver.

At block 406, the clock-and-data recovery unit of the receiver locks to a locally generated clock signal. In one embodiment, the clock-and-data recovery unit includes a voltage-control oscillator in a phase-locked loop, and the voltage-control oscillator locks to the local clock signal to get the voltage-control oscillator oscillating at the proper nominal frequency. At block 408, the clock-and-data recovery unit attempts to lock to a training sequence received from a transmitter via the communication link. If the training sequence is present, the clock-and-data recovery unit locks to the training sequence and indicates locking success. In one embodiment, the frequency of a voltage-control oscillator is adjusted to achieve phase lock with the training sequence, and then the voltage-control oscillator achieves frequency lock with the training sequence because the voltage-control oscillator was already oscillating at the proper nominal frequency. The attempt to lock to the training sequence may be unsuccessful if the communication link is not connected or if the transmitter is not transmitting the training sequence. After a timeout, the clock-and-data recovery unit indicates locking failure and process 400 returns to block 406.

At block 410 after the clock-and-data recovery unit has successfully locked to the training sequence, the decision feedback equalizer initializes its filter coefficients and adjusts the filter coefficients using the known values of the training sequence. In one embodiment, the decision feedback equalizer is a linear filter that adjusts its filter coefficients to replicate the inter-symbol interference of the communication link. The replicated inter-symbol interference is subtracted from the signal received from the communication link to reduce the inter-symbol interference.

At block 412, the transmitter transmits a serial sequence of bits and the receiver receives the serial sequence of bits. In one embodiment, the receiver communicates the successful training at blocks 408 and 410 to the transmitter and the transmitter responds by starting data transmission. For example, the communication link may connect transceivers providing bidirectional communication, and after the receiver of both transceivers is trained, both transmitters may start data transmission.

At block 414, the clock-and-data recovery unit recovers the received clock signal and the serial sequence of bits that the transmitter transmitted at block 412. At block 416, the aligner decodes data and control blocks from the serial sequence of bits. At block 418, the decision feedback equalizer updates its filter coefficients to reduce inter-symbol interference between the bits in the serial sequence. This tracks changes in the inter-symbol interference caused by effects such as temperature variations.

At block 420, the receiver performs clock compensation between the received and local clock signals. The transmitter transmits clock compensation sequences interspersed between various data sequences. To compensate for a difference in the nominal frequency of the received and local clock signals, the receiver may delete or add one or more control blocks from certain of the clock compensation sequences.

At block 422, the communication link disconnects the transmitter and the receiver. In one embodiment, the communication link is hot-pluggable and the communication link is disconnected to connect the transmitter and/or the receiver to another device.

At block 424, the clock-and-data recovery unit enters a deadlocked state, indicating the clock-and-data recovery unit is no longer locked to the serial sequence of bits and the received clock signal is no longer valid. In one embodiment, a phase detector in the clock-and-data recovery unit determines if the received clock signal is not phase locked with the indeterminate signal received from the disconnected communication link.

At block 426, the decision feedback equalizer updates its filter coefficients into a deadlocked state while the clock-and-data recovery unit is trying to recover the serial sequence of bits from the disconnected communication link. In one embodiment, before the clock-and-data recovery unit detects loss of lock, the filter coefficients are updated using the indeterminate signal received from the disconnected communication link. These updates to the filter coefficients from an indeterminate signal make the decision feedback equalizer no longer able to compensate for inter-symbol interference. Thus, the decision feedback equalizer updates the filter coefficients into a deadlocked state that prevents recovery of the serial sequence of bits. In another embodiment, the decision feedback equalizer systematically updates filter coefficients from defined initial values to compensate for inter-symbol interference, and the decision feedback equalizer cannot generally compensate for the inter-symbol interference of a different communication link unless the filter coefficients are systematically updated from these defined initial values. Thus, the filter coefficients are deadlocked whenever the filter coefficients do not have the defined initial values.

At block 428, the aligner scans for control blocks while the receiver is deadlocked. During this scan, the aligner repeats a constant data block value in one embodiment.

At block 430, the link recovery unit counts the blocks in the received sequence between each successive pair of control blocks. The link recovery circuit initiates initialization when the count exceeds a threshold number. The link recovery circuit resets the clock-and-data recovery unit and the decision feedback equalizer until the same or another transmitter begins transmitting the training sequence at block 402 and the same or another communication link connects this transmitter to the receiver at block 404.

After a connected transmitter is transmitting a training sequence, the link recovery unit releases the reset. In one embodiment, the link recovery unit asserts the reset for time interval sufficient for disconnection and reconnection of a communication link. The released reset permits the clock-and-data recovery unit to attempt recovering a received clock signal locked to the training sequence at blocks 406 and 408, and locked to the serial sequence of bits at block 414. The released reset permits the decision feedback equalizer to initialize its filter coefficients at block 410 and to update its filter coefficients at block 418. Thus, the link recovery unit's assertion and release of reset automatically initializes the clock-and-data recovery unit and the decision feedback equalizer, getting the receiver out of the deadlocked state.

The embodiments are thought to be applicable to a variety of systems for reconnecting a communication link. Other aspects and embodiments will be apparent to those skilled in the art from consideration of the specification. It is intended that the specification and illustrated embodiments be considered as examples only, with a true scope and spirit of the invention being indicated by the following claims.

What is claimed is:

1. A hot-pluggable communication circuit, comprising:
   a communication port configured to connect to and disconnect from a communication link;
   a receiver coupled to the communication port and configured to generate, while the communication link is connected to the communication port, a serial sequence of a plurality of received bits recovered from the communication link;
   an aligner coupled to the receiver and configured to decode a received sequence of a plurality of blocks from the serial sequence of the plurality of received bits;
   wherein the plurality of blocks of the received sequence includes a plurality of data blocks and a plurality of control blocks; and
   a link recovery circuit coupled to the receiver and the aligner, the link recovery circuit configured to reset the receiver in response to the plurality of blocks, in the received sequence after a first one of the plurality of control blocks and before a next one of the plurality of control blocks, numbering greater than a threshold number.

2. The hot-pluggable communication circuit of claim 1, wherein:
   each block in the received sequence includes ten of the received bits; and
   using an 8B10B code, each data block encodes an eight-bit data character and each control block encodes a control character.

3. The hot-pluggable communication circuit of claim 1, wherein each block in the received sequence includes sixty-six of the received bits, and using a 64B66B code, each data block encodes sixty-four data bits.

4. The hot-pluggable communication circuit of claim 3, wherein:
   each block in the received sequence begins with a header including two of the received bits having a first, a second, a third, and a fourth value;
   the second value of the header identifies the block as one of the plurality of data blocks;
   the third value of the header identifies the block as one of the plurality of control blocks; and
   the first and the fourth values of the header identify the block as one of a plurality of invalid blocks.

5. The hot-pluggable communication circuit of claim 1, wherein the plurality of blocks in the received sequence include an equal number of the plurality of received bits.

6. The hot-pluggable communication circuit of claim 1, wherein the receiver is configured to recover a received clock signal from the communication link while the communication link is connected to the communication port.

7. The hot-pluggable communication circuit of claim 6, wherein:
   the received sequence of the plurality of blocks includes a plurality of clock compensation sequences for compensating for a difference between a signaling rate for the received clock signal and a signaling rate for a local clock signal;
   each clock compensation sequence is a contiguous sequence of at least three of the plurality of control blocks;
   the link recovery circuit is configured to generate a count of the plurality of blocks in the received sequence between each successive pair of clock compensation sequences in the plurality of clock compensation sequences;
   the link recovery circuit is configured to reset the receiver in response to the count of the plurality of blocks between the first and next ones of the plurality of control blocks exceeding the threshold number for each successive pair of a first and a second clock compensation sequence; and
   the first one of the plurality of control blocks is a last control block in the first clock compensation sequence of the successive pair and the next one of the plurality of control blocks is an initial control block in the second clock compensation sequence of the successive pair.

8. The hot-pluggable communication circuit of claim 6, wherein:
   the receiver is in a deadlocked state while the communication link is disconnected from the communication port; and
   the receiver remains in the deadlocked state while the communication link is reconnected to the communication port, the deadlocked state preventing recovery of the serial sequence from the communication link.

9. The hot-pluggable communication circuit of claim 6, wherein:
   the aligner is configured to generate the received sequence including a plurality of repetitions of one of the data blocks while the receiver is in a deadlocked state; and
   the link recovery circuit is configured to reset the receiver in response to the plurality of repetitions of the one of the data blocks numbering greater than the threshold number.

10. The hot-pluggable communication circuit of claim 9, wherein:
    the link recovery circuit is configured to release the reset of the receiver while the communication link is providing a training sequence; and
    the receiver is configured to perform an initialization in response to the release of the reset while the communication link is connected to the communication port and the communication link is providing the training sequence.

11. The hot-pluggable communication circuit of claim 10, wherein:
    the receiver includes a clock-and-data recovery unit and a decision feedback equalizer;
    the clock-and-data recovery unit is configured to perform, in response to the release of the reset while the communication link is connected to the communication port and the communication link is providing the training sequence, the initialization, including recovering a received clock signal locked to the training sequence from the communication link;
    while the communication link is disconnected from the communication port, the clock-and-data recovery unit is in the deadlocked state that indicates the received clock signal is no longer locked to the communication link;

while the communication link is reconnected to the communication port, the clock-and-data recovery unit remains in the deadlocked state that indicates the received clock signal is not locked to the communication link;

the decision feedback equalizer is configured to perform, in response to the release of the reset while the communication link is connected to the communication port and the communication link is providing the training sequence, the initialization including initializing a plurality of filter coefficients for reducing inter-symbol interference among the plurality of received bits in the serial sequence following the training sequence;

while the communication link is disconnected from the communication port, the plurality of filter coefficients of the decision feedback equalizer is in the deadlocked state; and while the communication link is reconnected to the communication port, the plurality of filter coefficients of the decision feedback equalizer remain in the deadlocked state preventing recovery of the serial sequence from the communication link.

12. The hot-pluggable communication circuit of claim 11, wherein:

the received sequence of the plurality of blocks includes a plurality of clock compensation sequences for compensating for a difference between a signaling rate for the received clock signal and a signaling rate for a local clock signal;

each clock compensation sequence is a contiguous sequence of at least three of the plurality of control blocks;

the link recovery circuit is configured to generate a count of the plurality of blocks in the received sequence between each successive pair of clock compensation sequences in the plurality of clock compensation sequences;

the link recovery circuit is configured to reset the receiver in response to the count of the plurality of blocks between the first and next ones of the plurality of control blocks exceeding the threshold number for each successive pair of a first and a second clock compensation sequence; and the first one of the plurality of control blocks is a last control block in the first clock compensation sequence of the successive pair and the next one of the plurality of control blocks is an initial control block in the second clock compensation sequence of the successive pair.

13. The hot-pluggable communication circuit of claim 1, wherein:

the aligner is configured to generate the received sequence including a plurality of invalid blocks while not having a block-synchronization with the serial sequence of the plurality of received bits;

the aligner is configured to generate the received sequence including the plurality of data blocks and the plurality of control blocks while having the block-synchronization with the serial sequence of the plurality of received bits; and the link recovery circuit is configured to reset the receiver in response to the pluralities of data and invalid blocks, in the received sequence after the first one of the plurality of control blocks and before the next one of the plurality of control blocks, numbering greater than the threshold number.

14. The hot-pluggable communication circuit of claim 13, wherein the aligner loses the block-synchronization while the communication link is disconnected from the communication port.

15. The hot-pluggable communication circuit of claim 1, wherein:

the link recovery circuit is configured to reset the receiver in response to the plurality of blocks, in the received sequence after the first one of the plurality of control blocks and before the next one of the plurality of control blocks, numbering greater than the threshold number; and the plurality of blocks, in the received sequence after the first one of the plurality of control blocks and before the next one of the plurality of control blocks, numbers greater than the threshold number in response to the communication link being disconnected from the communication port.

16. The hot-pluggable communication circuit of claim 1, wherein:

the link recovery circuit is configured to initialize a count at each of the plurality of control blocks and to increment the count at each of the plurality of blocks that is not one of the plurality of control blocks; and the link recovery circuit is configured to reset the receiver in response to the count exceeding the threshold number.

17. A hot-pluggable communication circuit, comprising:

a transmitter configured to serially transmit a training sequence during initialization, and following the initialization to serially transmit a first serial sequence including a plurality of bits;

a receiver configured to generate a received sequence of a plurality of blocks;

a communication link for coupling the transmitter and the receiver, the communication link configured to connect and disconnect the transmitter and the receiver; and wherein the receiver includes:

a link recovery circuit configured to initiate the initialization in response to the plurality of blocks, in the received sequence after one of a plurality of control blocks in the plurality of blocks and before a next one of the plurality of control blocks, numbering greater than a threshold number;

a clock-and-data recovery circuit configured to recover a received clock signal locked to the training sequence while the communication link connects the transmitter and the receiver during the initialization, and following the initialization to recover the received clock signal locked to the first serial sequence and to serially recover a second serial sequence including the plurality of bits; and an aligner configured to decode the received sequence of the plurality of blocks from the second serial sequence of the plurality of bits.

18. The hot-pluggable communication circuit of claim 17, wherein:

the receiver is in a deadlocked state while the communication link disconnects the transmitter and the receiver; and the receiver remains in the deadlocked state while the communication link reconnects the transmitter and the receiver, the deadlocked state preventing recovery of the second serial sequence.

19. The hot-pluggable communication circuit of claim 18, wherein:

the aligner is configured to generate the received sequence including a plurality of repetitions of one of a plurality of data blocks in the plurality of blocks while the receiver is in the deadlocked state; and the link recovery circuit is configured to initiate the initialization in response to the plurality of repetitions of the one of the data blocks numbering greater than the threshold number.

20. The hot-pluggable communication circuit of claim 19, wherein:

the received sequence of the plurality of blocks includes a plurality of clock compensation sequences for compensating for a difference between a signaling rate for the received clock signal and a signaling rate for a local clock signal of the receiver;

each clock compensation sequence is a contiguous sequence of at least three of the plurality of control blocks;

the link recovery circuit is configured to generate a count of the plurality of blocks in the received sequence between each successive pair of clock compensation sequences in the plurality of clock compensation sequences;

the link recovery circuit is configured to initiate the initialization in response to the count of the plurality of blocks between the first and next ones of the plurality of control blocks exceeding the threshold number for each successive pair of a first and a second clock compensation sequence; and the one of the plurality of control blocks is a last control block in the first clock compensation sequence of the successive pair and the next one of the plurality of control blocks is an initial control block in the second clock compensation sequence of the successive pair.

\* \* \* \* \*